United States Patent
Walker

(10) Patent No.: US 6,777,542 B2
(45) Date of Patent: Aug. 17, 2004

(54) METHOD AND APPARATUS FOR REDUCING THE CALCIUM AND PHOSPHOROUS RATIO AND INCREASING CRUDE PROTEIN IN SHELLFISH WASTE MEAL

(76) Inventor: C. Reuben Walker, 810 E. Butcher Switch Rd., Lafayette, LA (US) 70507

( * ) Notice: Subject to any disclaimer, the term of this patent is extended or adjusted under 35 U.S.C. 154(b) by 0 days.

(21) Appl. No.: 09/927,996

(22) Filed: Aug. 10, 2001

(65) Prior Publication Data

US 2003/0040488 A1 Feb. 27, 2003

(51) Int. Cl.$^7$ .................................................. A23J 1/04
(52) U.S. Cl. ........................ 530/412; 424/493; 536/20; 423/173; 260/112; 260/122; 260/211
(58) Field of Search ................................. 260/112, 122, 260/211; 423/173; 536/20; 424/493

(56) References Cited

U.S. PATENT DOCUMENTS 4,199,496 A * 4/1980 Peniston ................. 260/112 R

* cited by examiner

Primary Examiner—Christopher Tate
Assistant Examiner—Roy Teller
(74) Attorney, Agent, or Firm—Tyrone Davis; John S. Kendall; Davis & Kendall, PC

(57) ABSTRACT

This invention relates to a method and apparatus for the processing of shellfish waste meal. More particularly, to increasing the crude protein while decreasing calcium and phosphorus levels of shellfish waste meal. The method significantly reduces the percent calcium and phosphorus in shellfish waste meal by introducing a strong acid while lowering the ratio of calcium to phosphorus and raising or maintaining protein levels of the shellfish waste meal at a neutral pH level.

10 Claims, 5 Drawing Sheets

METHOD AND APPARATUS FOR REDUCING THE CALCIUM AND PHOSPHOROUS RATIO AND INCREASING CRUDE PROTEIN IN SHELLFISH WASTE MEAL

FIELD OF THE INVENTION

This invention relates to a method and apparatus for the processing of shellfish waste meal (SWM). More particularly, to increasing the crude protein while decreasing calcium and phosphorus levels of SWM. The method significantly reduces the percent calcium and phosphorus in shellfish waste meal while lowering the ratio of calcium to phosphorus and raising or maintaining protein levels. These findings make the waste meal a more viable economical protein source in fertilizer and livestock rations.

BACKGROUND OF THE INVENTION

Proper disposal of aquatic waste is a growing environmental problem for the aqua-culture industry in Louisiana and other coastal areas of the United States. Freshwater Crawfish (*Procambarus clarkii*) and the White River Crawfish (*Procambarus zonangulus*) are important commercial commodities in Louisiana. Louisiana produces over 90% of the crawfish harvested in the United States. The state's aquaculture industry has over 100 crawfish shrimp and crab processing plants. These plants bag the shellfish for sale and or extract the tail meat from the millions of pounds processed at the plants. Of the amount of shellfish harvested each year, approximately 85% (34 to 85 million pounds) is classified as crawfish waste. Analogously, of the crab, and shrimp harvested each year, approximately 60% to 70% is waste respectfully. The exploration of ways to utilize the waste makes good environmental and economical sense.

Shellfish waste is an abundant product emanating from the over 100 crawfish plants in South Louisiana. The reluctance of feed manufacturers to use concentrated amounts of crawfish and other shellfish waste has been due to the high calcium percentage in the meal. More particularly, crawfish waste meal can have an average of 13% to 22% calcium while having a calcium to phosphorous ratio of 18:1 or higher. The percentage of calcium can vary due to the stage of growth of the shellfish and amount of shell in the waste.

The general accepted recommendation in the feed industry is to restrict crawfish or shellfish meal to 10% of the ration for monogastrics and ruminants. The percentage of calcium, phosphorous and the high ratio of calcium to phosphorous and its inhibition of other nutrients are the primary reasons for the feed manufacturers to not seriously consider these meals in their feed rations.

Researchers have attempted to address the problem of commercial shellfish waste but have not found methods which are both economical and ecologically safe. As shown in U.S. Pat. No. 6,153,251 issued to FuKuhara et al. discloses a nutrition-enriched composition for animal feed.

U.S. Pat. Nos. 6,042,464 and 6,102,790 issued to Cowsar et al. shows automated apparatus and method for extracting tail meat from crawfish.

U.S. Pat. No. 5,972,403 issued to Tiller discloses a method for removing salt and water from a fish meal production stream without sacrificing fish protein solids.

U.S. Pat. No. 1,941,001 issued to Braginsky et al. disclose apparatus for the removal and recovery of crustacean meat.

The present invention overcomes the problem of high calcium concentrations and the high calcium to phosphorous ratios normally associated with shellfish waste meal and creates potentially a new revenue stream for the U.S. aquaculture industry.

SUMMARY OF THE INVENTION

The invention overcomes the problem of the high calcium and phosphorous counts in shell fish, while significantly reducing the shell fish waste disposal problem in Southern Louisiana. The method allows for the processing of ground shellfish meal into fractionated shell and meal components. The meal component is further processed to a new meal that has a significant reduction in calcium and phosphorous, while maintaining or raising the crude protein in the new crawfish meal product.

Table 1 shows the comparison of unprocessed crawfish waste meal (control) relative to the Method. Table 1 shows that by using the Method, crude protein was significantly increased beyond 50%, while calcium and phosphorous levels were significantly reduce. Conversely, the calcium to phosphorous ratio was also significantly reduced. A major difference in Methods 1, 2 and 3 were the strength of the reagent used in the solution brine. Crawfish waste from the multitude of crawfish plants in South Louisiana and other areas can be converted to crawfish meal and further processed using the Method.

Table 2 shows a comparision of crude protein, calcium, and phosphorous for soybean meal, unprocessed crawfish and processed crawfish. The levels of crude protein are significantly increased for the processed crawfish meal with the calcium and phosphorous levels decreased.

It is an object of the invention to provide a method for increasing the crude protein in shellfish meal.

It is another object of the invention to provide a method to reduce the calcium to phosphorous ratios in shellfish meal.

Another object of the invention is to reduce the annual tonnage of shellfish waste in the United States.

An object of the invention is to provide method of generating a shellfish meal acceptable for use as a fertilizer.

It is another object of the invention to provide apparatus which alows the economical processing of shellfish meal.

Other features and advantages of the present invention will be apparent from the following description in which the preferred embodiments have been set fourth in conjunction with the accompanying drawings.

BRIEF DESCRIPTION OF THE DRAWINGS

In describing the preferred embodiments of the invention reference will be made the series of figures and drawings briefly described below.

There may be additional structures described in the foregoing application which are not depicted on one of the described drawings. In the event such a structure is described but not depicted in a drawing, the absence of such a drawing should not be considered as an omission of such design from the specification.

DETAILED DESCRIPTION OF THE INVENTION

In the following description, the present invention will be described in this embodiment as a process for producing shellfish meal. Those skilled in the art will readily recognize that the equivalent of such process and its applicability for all crustaceans.

Figure 1:
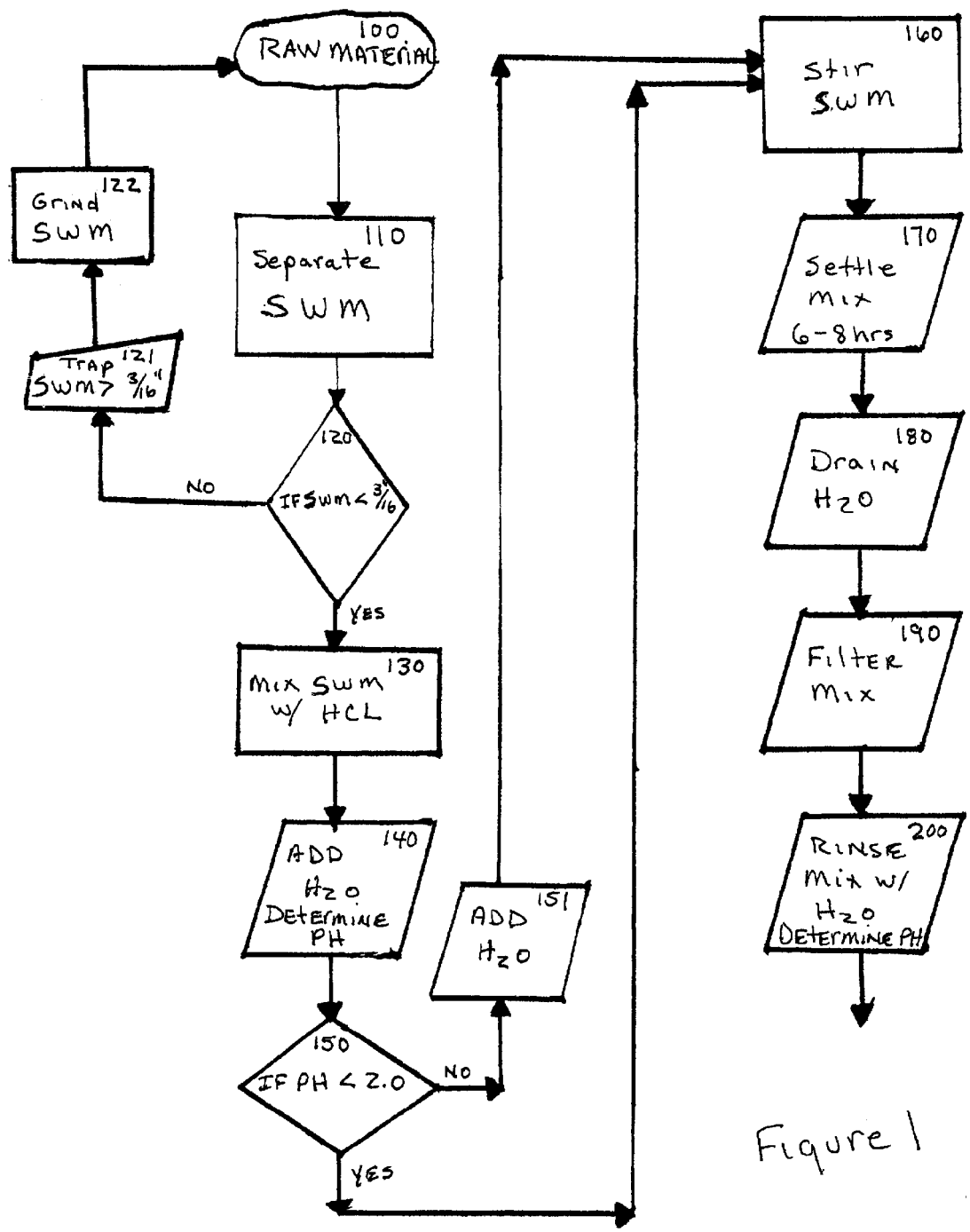
FIG. 1 shows schematic of the process flow diagram.
Figure 2:
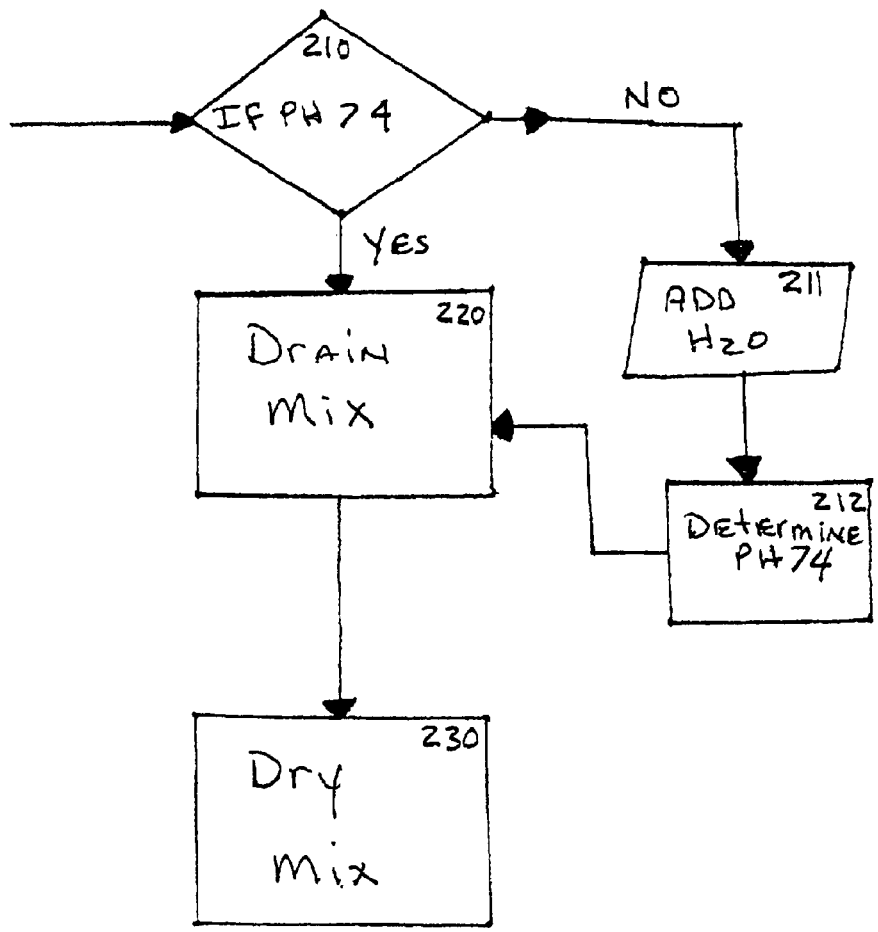
FIG. 2 continues the process flow diagram of the method.

Referring to FIGS. 1 and 2 step 1 (100), dried material of SWM is introduced into the process flow. Step 2 (110), the SWM is loaded into a mechanical or electrical feed separator. Step 3 (120), the separator allows small pieces of SWM to fall into a collection pan. The separator has a mesh screen with 3/16 inch openings. The pieces of SWM that are larger than 3/16 inches are sent to a grinder (122) and returned to the separator. Step 4(130), the pieces which are 3/16 inch or less are removed from the collection pan and placed into stainless steel container and mixed with a strong acid preferably hydrochloric acid (HCL). Step 5 (140), water is added. Step 6 (150), the ph is determined. If the ph is not less than 2.0 then water is added. Step 7 (160), the SWM mix is stirred and step 8 (170) allowed to settle for 4–8 hours. Step 9, (180) the liquid is drained and step 10 (190) the mix is filtered. Step 11 (200), the mix is rinsed with water and step 12 (210) the ph of the mix is determined. If the ph is not greater than 4.0 then more water is added (211). Step 13 (220) the water is drained from the mix. Finally, step 13 (230) the mix is dried and bagged for use.

Figure 3:
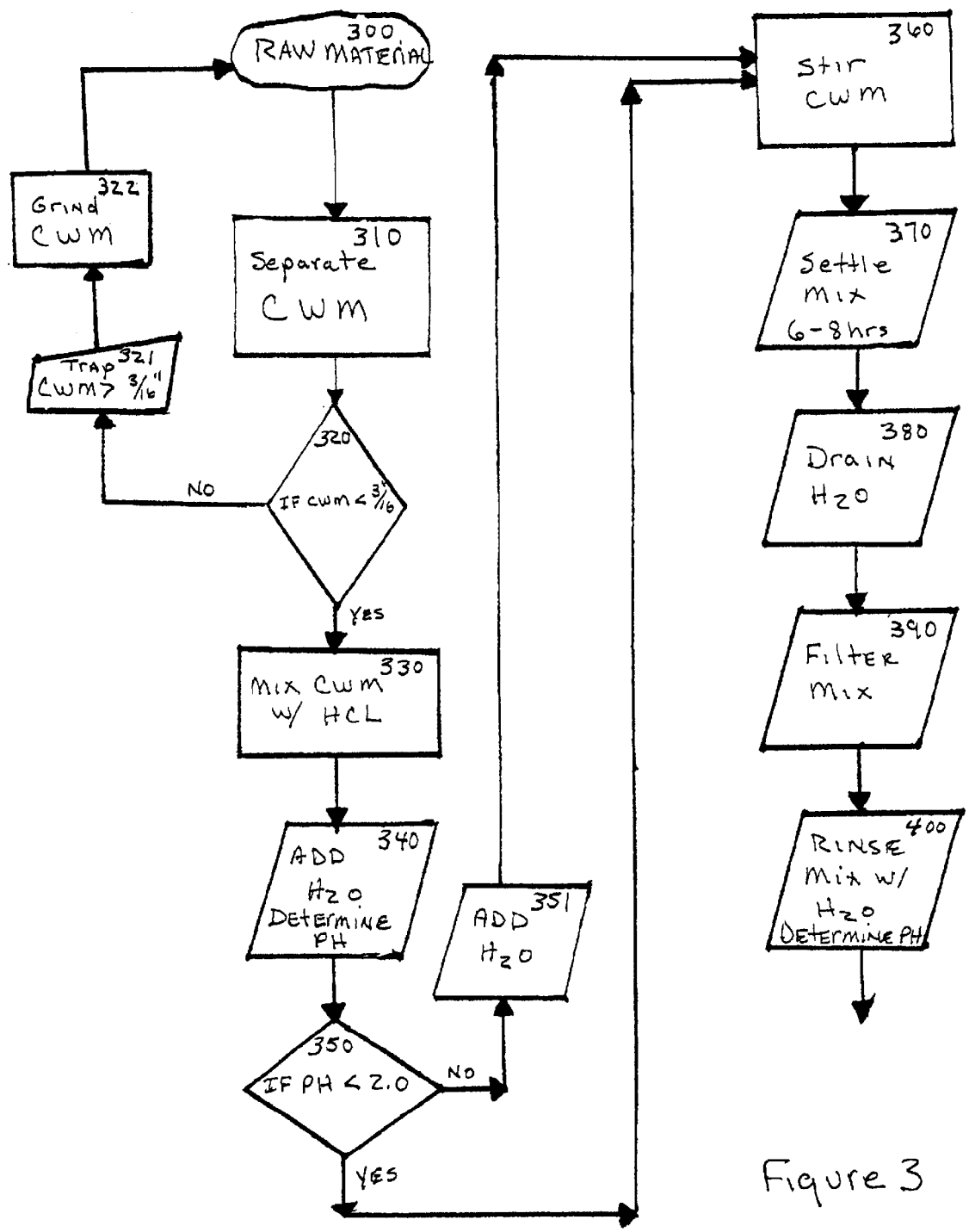
FIG. 3 shows the process using crawfish waste meal.
Figure 4:
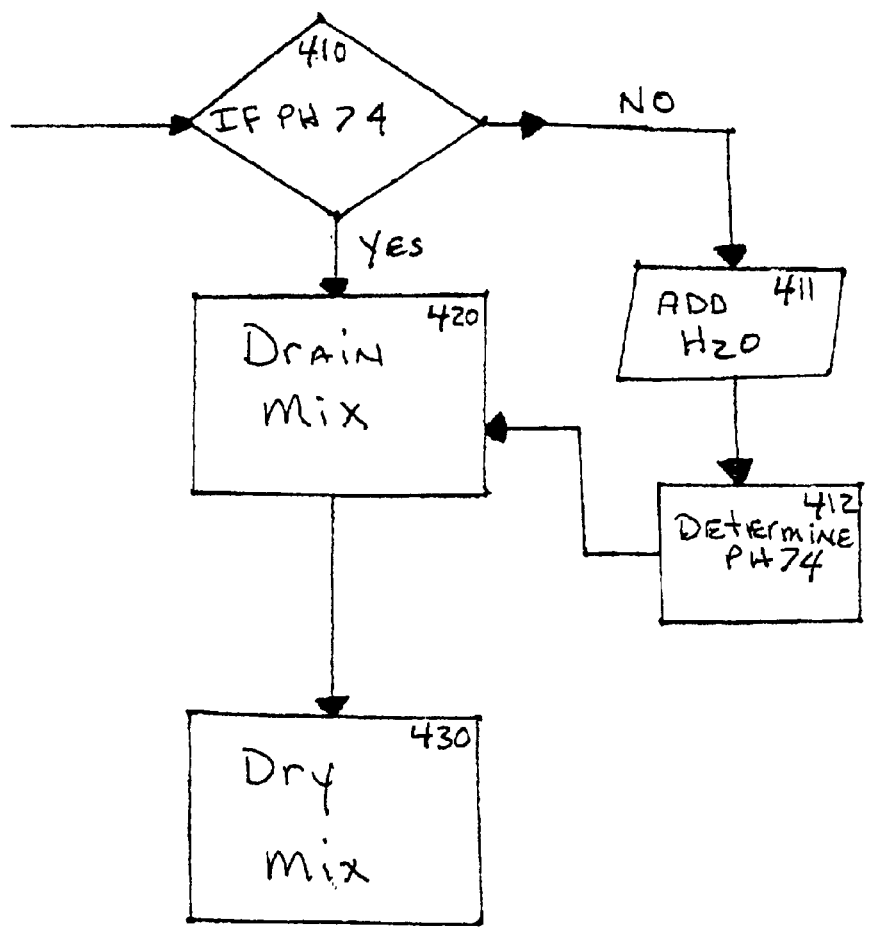
FIG. 4 continues the process flow diagram of FIG. 3.
Figure 5:
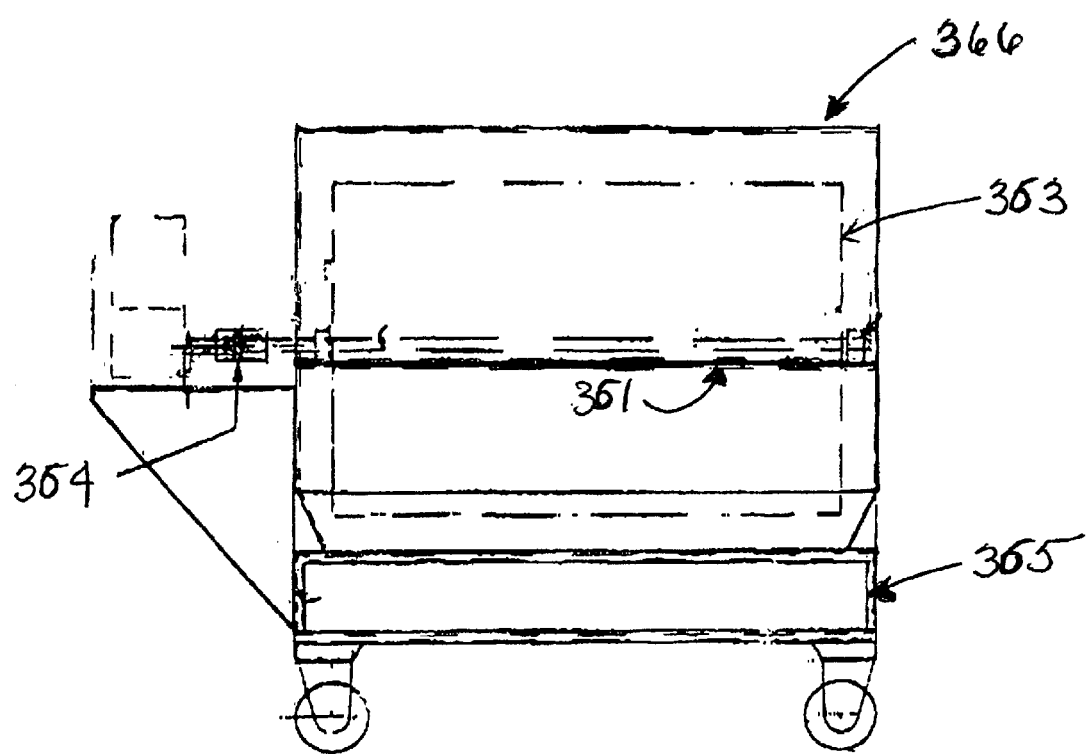
FIG. 5 shows the separator.

In the preferred process of FIGS. 3 and 4, dried crawfish waste meal (CWM) is used as dried material, and is introduced into the process flow (300). Step 2 (310), the CWM is loaded into a mechanical or electrical feed separator. Step 3 (320), the separator allows small pieces of CWM to fall into a collection pan. As shown in FIG. 5, the separator (366) has a mesh screen (361) with 3/16 inch openings (362). A center cylinder (363) is attached to a motor (364). The separator is electrical however manual operation is possible by placing a hand crank (not shown) on the center cylinder (353). In operation, as the separator (366) is turned, the pieces of CWM that are smaller than 3/16 inches are dropped to the bottom catch pan (365). The larger pieces are sent to a grinder (322) and returned to the separator (366). Step 4 (330), the pieces which are 3/16 inch or less are removed from the collection pan and placed into stainless steel container and mixed with hydrochloric acid (HCL). Step 5 (340), water is added. The ratio of HCL to water should be in the 288 milliliters of HCL for every 1000 milliliters of water. Either tap water or deionized water is sufficient for this purpose. The liquid solution should be at least ½ to ¾ inch above the CWM. Step 6 (350), the ph is determined. If the ph is not less than 2.0 then more water is added to lower the ph. A ph of about 1.1 is desirable. Step 7 (360), the CWM mix is stirred and step 8 (370) allowed to settle for 4–8 hours. Step 9, (380) the liquid is drained using a screen mesh catch basin having a mesh size of 0.085 and 0.142. Step 10 (390) the mix is filtered. Step 11 (400), the mix is rinsed with water and step 12 (410), the ph of the mix is determined. If the ph is not greater than 4.0 then more water is added (411). Step 13 (420) the water is drained from the mix. Finally, step 13 (430) the mix is dried and bagged for use.

Further modification and variation can be made to the disclosed embodiments without departing from the subject and spirit of the invention as defined in the following claims. Such modifications and variations, as included within the scope of these claims, are meant to be considered part of the invention as described

TABLE 1

Comparison of unprocessed vs. chemically processed crawfish waste meal.

| Nutrient | *Control | *Treatment #1 | *Treatment #2 | *Treatment #3 |
|---|---|---|---|---|
| Crude Protein (%) | 31.40$^b$ | 61.10$^a$ | 57.90$^a$ | 61.60$^a$ |
| Crude Fiber (%) | 13.00$^b$ | 33.00$^a$ | 31.50$^a$ | 29.60$^a$ |
| Calcium (%) | 15.40$^a$ | .80$^b$ | .38$^c$ | .03$^d$ |
| Phosphorous (%) | 1.36$^a$ | .36$^b$ | .25$^c$ | .07$^d$ |
| Ca:P Ratio | 11.30$^a$ | 2.20$^b$ | 1.57$^c$ | .43$^d$ |

$^{a,b,c,d}$Superscripts denote statistical significant differences at ($P < .01$).
*Control denotes no chemical treatment of the crawfish waste meal. Treatment #1 denotes the use of a strong acid (three molar concentration and two rinses of the product). Treatment #2 denotes the use of a strong acid (three molar concentration and three rinses of the product). Treatment #3 denotes the use of a strong acid (four molar concentration and two rinses of the product).

TABLE 2

Comparison of lysine and methionine profiles of unprocessed crawfish waste meal, soybean meal and chemically processed crawfish waste weal.

| Nutrient | *Control | *Soybean Meal | *Processed Crawfish Meal |
|---|---|---|---|
| Crude Protein % | 34.60%$^a$ | 46.80%$^b$ | 61.30%$^c$ |
| Lysine (gm/100 gm) | 1.34%$^a$ | 2.90$^b$ | 2.30$^b$ |
| Methionine (gm/100 gm) | .53$^a$ | .57$^a$ | .94$^b$ |
| Calcium (%) | 14.90%$^a$ | .38$^b$ | .49$^c$ |
| Phosphorous (%) | 1.50$^a$ | .67$^b$ | .12$^c$ |

$^{a,b,c}$Superscripts denote statistical significant differences at ($P < .01$).
*Control (crawfish meal) and soybean meal samples were chemically treated. The processed crawfish waste meal was treated with a strong acid (three molar concentration and two rinses of the product).

What is claimed is:

1. A method of processing shellfish waste for livestock feed comprising the steps of:
    a) drying the shellfish waste;
    b) grinding the shellfish waste to create a meal;
    c) mixing said shellfish waste meal with an acid;
    d) adding a liquid to the acidified shellfish waste meal creating a slurry;
    e) maintaining the pH of the slurry at a pH less than 4.0;
    f) intermittently stirring and settling the slurry;
    g) draining the slurry to create a treated shellfish meal;
    h) adjusting the pH of the treated shellfish waste meal to the range of 6.5 to 7.0;
    i) draining the pH adjusted shellfish waste meal;
    j) rinsing the pH adjusted shellfish waste meal;
    k) drying the pH adjusted shellfish waste meal.

2. The method as recited in claim 1 whereby said step c of adding an acid, said acid is hydrochloric acid.

3. The method as recited in claim 2 whereby said step of g further comprises draining the treated shellfish waste meal having an effluent discharge pH that is less than or equal to 4.0.

4. The method as recited in claim 3 whereby said step f of stirring and settling the slurry is timed within the range of 4–8 hours.

5. The method as recited in claim 4 whereby said addition of a liquid comprises $H_2O$.

6. The method as recited in claim 1 whereby the treated shellfish waste meal comprises:
  a protein percentage by weight in a range from 47–62%;
  a phosphorous percentage by weight of less than 0.5%; and
  a calcium percentage by weight of less than 1%.

7. A method of processing shellfish waste for protein supplement comprising the steps of;
  a) drying the shellfish waste;
  b) grinding the shellfish waste to create a meal;
  c) mixing said shellfish waste meal with an acid;
  d) adding a liquid to the acidified shellfish waste meal creating a slurry;
  e) maintaining the pH of the slurry at a pH less than 4.0;
  f) intermittently stirring and settling the slurry;
  g) draining the slurry to create a treated shellfish meal;
  h) adjusting the pH of the treated shellfish waste meal to the range of 6.5 to 7.0;
  i) draining the pH adjusted shellfish waste meal;
  j) rinsing the pH adjusted shellfish waste meal;
  k) drying the pH adjusted shellfish waste meal whereby said shellfish waste meal comprises a protein percentage by weight in a range from 47–62%, a phosphorous percentage by weight of less than 0.5%, and a calcium percentage by weight in a range from 0–2%.

8. The method as recited in claim 7 whereby said step c of adding an acid, said acid is hydrochloric acid.

9. The method as recited in claim 8 whereby said step of g further comprises draining the treated shellfish waste meal having an effluent discharge pH that is less than or equal to 4.0.

10. The method as recited in claim 9 whereby said step f of stirring and settling the slurry is timed within the range of 4–8 hours.

* * * * *